W. GERHARDT.
Apparatus for the Manufacture of Iron and Steel.
No. 52,559. Patented Feb. 13, 1866.
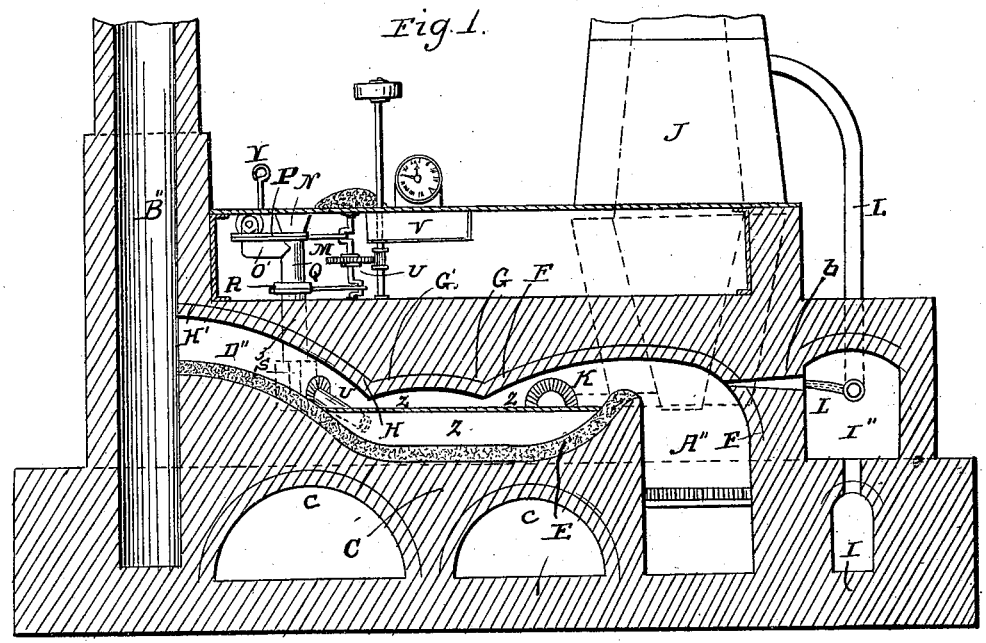
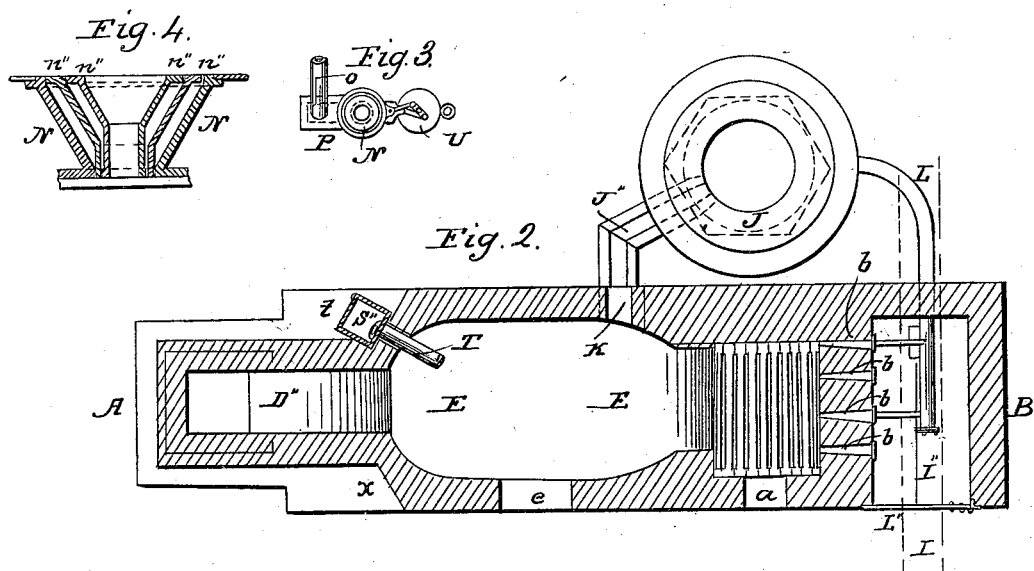

UNITED STATES PATENT OFFICE.

WILLIAM GERHARDT, OF PITTSBURG, PENNSYLVANIA.

IMPROVED APPARATUS FOR THE MANUFACTURE OF IRON AND STEEL.

Specification forming part of Letters Patent No. 52,559, dated February 13, 1866.

*To all whom it may concern:*

Be it known that I, WILLIAM GERHARDT, of the city of Pittsburg, in the county of Allegheny and State of Pennsylvania, have invented a new and Improved Apparatus for Manufacturing Wrought-Iron or Puddled Steel; and I do hereby declare that the following is a full and exact description thereof, reference being had to the accompanying drawings, and to the letters of reference marked thereon, in which—

Figure 1 is a sectional elevation through the line A B. Fig. 2 is a plan or top view of the furnace with the arch or roof removed. Fig. 3 is a top view of the mechanism for working the valves P and R, and Fig. 4 is a section of the funnel N on a larger scale to illustrate it more fully.

My invention consists in an apparatus so constructed as to introduce in cast-iron in a molten condition oxide of iron, iron ore, or other purifying chemicals, by means and use of a blast, and to measure and record the quantity of chemicals so introduced in the said melted cast-iron, in order that the process of decarbonizing or purifying iron may be carried out in a perfect and regular manner.

To enable others skilled in the art to make and use my invention, I will proceed to describe it in detail.

C is a furnace or oven, in many respects similar to ordinary puddling-furnaces. $c''$ $c''$ are arches to keep the earth dry and insure a greater degree of heat being attained in the oven. D is the bridge-wall; $D''$, the throat or neck. E E is the basin, lined with any suitable composition, for earths. $A''$ is the fireplace. $B''$ is the stack. F F' is the first arch, springing from the furnace and terminated by a flattened arch at or near the one-third of the length of the basin E. G G' is the second arch, springing from the butt of the arch F F' and extending to about three-quarters of the length of the basin E. H $H''$ is the arch or covering of the neck or throat. I is the cold-air flue, and $I''$ is the cold-air chamber, where the air arrives by natural draft or is condensed by a blower. J is a blast-furnace. $J''$ is the run or spout to convey the melted pig-iron from the furnace J to the basin E E. K is the hole through which said iron is introduced. L is a pipe to collect the unburned gases from the air-furnace J and convey them to the flues $b$ $b$. $p$ $p$ are flues to admit fresh air from the chamber $I''$ into the furnace $A''$. The flues $b$ $b$ and $p$ $p$ are provided with registers to allow of the draft being regulated or shut off entirely at will.

$L''$ is a door to enter the air-chamber $l''$; $a$ is the door for introducing fuel in the furnace $A''$, and $e$ is the door for puddling the iron or steel.

M is the apparatus for injecting the chemicals into the cast-iron and recording the same. It consists of the following parts:

N is the funnel. This funnel is provided with smaller funnels, $n''$ $n''$ $n''$ $n''$, which fit one inside the other, so as to reduce more and more, at pleasure, the capacity of the funnel N, and thus regulate the amount of chemicals introduced at each stroke of the apparatus, as hereinafter described.

O is the blast-pipe coming from the blowers or gasometer. P is the upper valve, which is so constructed that when the funnel is open at bottom, to allow the chemicals contained and measured in it to fall in the apparatus M, the valve P shuts off the blast from the pipe O, and when the bottom of the funnel N is shut, ready to receive a new portion of chemicals, then the blast-valve is open to admit of the blast coming by the pipe O to pass by the pipe O' into the pipe Q.

R is the bottom valve, on which the chemicals fall, and which, by opening, allows it or them to fall through the pipe S into the box $S''$. The box $S''$ is made of cast-iron or any other suitable material, and it has a door at $t$, which can open when it is necessary to change the pipe T. The pipe T is made of suitable refractory substance. It is introduced into the furnace by the door $t$ of the box $S''$, and it is placed extending downward in the basin E, so that when the melted iron is run into said basin the end of the pipe T will dip into the melted cast-iron.

U is the machinery intended for moving the valves P and R, which is, in my drawings, composed of a double-throw crank-shaft driven by a spur-wheel and pinion; but any other suitable mechanism can be used which will answer the purpose of moving the valves P and R so that they open and shut alternately.

V is a counting and recording instrument and dial, which counts and records the number of times that the valves P and R are open and shut. Z is the cast-iron in a molten state covered with its slag $z\ z$.

The operation of my apparatus is as follows: The fire being lit in the furnace $A''$, if the pig-iron is to be melted in the furnace itself the pig-iron is introduced in the basin by the door $a$, or if the cast-iron is to be melted in the furnace J, as soon as the basin E and arches $F'\ G\ G'$ are of the suitable heat the melted iron is run from the air-furnace J by the spout $J''$ and through the hole K into the basin E.

The funnel N having previously been regulated, by the introduction of the funnels $n''\ n''$, so as to be of the proper capacity, the machinery U is set in motion and the funnel N filled with chemicals and raked level with the scraper Y. This may be done by hand or by machinery, as it is found more convenient. The blast, by passing through the pipe Q, box $S''$, and pipe T, will carry with it the chemicals, which are dropped into the pipe Q by the opening of the valve P.

The decomposition of the chemicals into the mass of melted cast-iron will greatly increase the heat of said cast-iron as it decarbonizes and purifies it.

At a point of the process where it is required to maintain the heat of the metal and have no smoke or sulphurous vapors in the oven, no more coals are introduced into the fire, and the registers of the flues $b\ b$ are open, allowing the combustible gases from the blast-furnace J to be drawn down by the pipe L and tubes $b\ b$ into the furnace $A''$, where they meet fresh air arriving by the flues $p\ p$, and are ignited, producing an intense heat without any smoke or sulphurous fumes.

I have only represented one oxide and chemical injector in my apparatus, but a second one can be placed at X, and for larger furnaces a greater number can be introduced.

What I claim as my invention, and desire to secure by Letters Patent of the United States, is—

1. The furnace C, with one or more chemical injectors introduced, in the manner and for the purpose specified.

2. The combination of the pipe T, box $S''$, pipe S, valve R, pipe Q, pipe $O'$, double valve P, pipe O, and funnel N, forming a chemical injector, as described, and for the purpose specified.

3. The funnels $n\ n\ n''\ n''$, in combination with the funnel N, for the purpose specified.

4. The combination of the counting and recording instrument and dial V with the mechanism M and U, and the valves P and R of the chemical injector, for the purpose specified.

5. The combination of the two arches $F\ F'$ and $G\ G'$ with the basin E, as described.

6. The flues $p\ p$, as described, and for the purpose specified.

7. The flues $b'\ b'$ and pipe L, arranged as and for the purpose specified.

WILLIAM GERHARDT. [L. S.]

Witnesses:
H. P. GENGEMBRE,
P. A. STOUT.